May 14, 1940. A. J. BOYNTON ET AL 2,200,980
METHOD AND APPARATUS FOR ELIMINATING MOISTURE FROM GAS OR AIR
Filed Oct. 24, 1938 2 Sheets-Sheet 2

INVENTOR.
Arthur J. Boynton,
Gilbert D. Dill,
BY
ATTORNEYS.

Patented May 14, 1940

2,200,980

UNITED STATES PATENT OFFICE 2,200,980

METHOD AND APPARATUS FOR ELIMINATING MOISTURE FROM GAS OR AIR

Arthur J. Boynton, Winnetka, and Gilbert D. Dill, Chicago, Ill., assignors to H. A. Brassert & Company, Chicago, Ill., a corporation of Illinois Application October 24, 1938, Serial No. 236,650

4 Claims. (Cl. 183—81)

This invention relates to a new and improved method and apparatus for eliminating moisture from gas or air and more particularly to such a method and apparatus for use in conjunction with means and methods for washing air or gas with water or moisture.

In the carrying out of various industrial processes it is often necessary or desirable to eliminate finely divided moisture from a body or stream of air or gas. This is necessary whenever moist air is to be dried by condensation of moisture and it is also necessary when cleaning industrial gases by wet methods. In the latter case, the cleaning process consists first in the moistening of particles of dust contained in the gas, and their elimination from the stream of gas in the water in which they are contained. Wet cleaning is therefore a process having two stages, the first of which is the sub-division of water into particles so minute and so closely interspersed in the gas that all particles of dust are wet, while the second stage consists in the agglomeration of the minute particles of dirty water into drops sufficiently large to be removed by gravity from the body of gas. The present invention deals with the second stage of cleaning.

We have found that the aggregation of minute particles of water into larger drops can advantageously be done by passing the gas preferably in a downward direction through a plurality of parallel conduits of relatively small diameter, each conduit being provided with a vane radial to the conduit and of spiral shape, with the pitch of the spiral preferably between three-quarters and one and a half diameters of the conduits. The length of the parallel passages may vary from two to six times their diameter. The direction of the gas is preferably downward in order to produce a concurrent flow of gas and water. No spraying is required in the moisture eliminator, excepting for an occasional removal of accumulated dirt, the spraying period being five to ten minutes and the interval between successive spraying six to eight hours.

The spiral direction of the gas flow tends, first of all, to exert centrifugal force on minute particles of water and so, to bring them into contact with the inner circular wall of the conduit. The spiral motion further forces water thus brought into contact with the outer wall to travel circumferentially along the surface of the wall until it reaches the intersection between wall and vane, after which it follows the spiral path made by such intersection of wall and vane downward. During such downward course, it meets and coheres with many other water particles so that the net result is a series of large drops of water which fall from the lower end of each conduit at the point of intersection between wall and vane and drop into the chamber below.

We have also found that these drops of water are of such size that they will separate from a current of gas, provided the velocity of the latter is less than twenty feet per second. If this condition is fulfilled, removal of moisture above the point of saturation is substantially complete, tests failing to show any excess water. The effect of the eliminator is therefore not only to remove the water from the gas, but also to remove such dust as is in suspension in the water. For example, gas coming from the washer shown in the copending application of Arthur J. Boynton, Serial No. 236,213, filed October 21, 1938, may have a dirt content of .13 grain per cubic foot of gas. Elimination of water as above described brings the dirt content down to .07 grain per cubic foot of gas. In the event the present eliminator operates after a final cleaner, the removal of dirt which accompanies the removal of water will be of the order of a reduction from .025 grain per cubic foot to .005 grain per cubic foot.

We have determined that the optimum area of horizontal cross section through the vertical conduits is about two and one-half feet per 1,000 cubic feet per minute of nominal volume of gas at normal temperature and pressure. The greater the area below the parallel conduits, the lower the velocity of the passing gas will be and the less will be the chance for local reentrainment of water by gas currents. We therefore preferably locate the outgoing conduit for dried gas within the eliminator shell. We prefer to equalize the nominal velocity of the gas passing downward and passing upward about the lower edge of the vertical outlet passage.

With regard to the entrance of gas to the eliminator, it is important that the entry is so made as not to disturb the streams of water which occasionally issue from the sprays and so to cause a failure of sprayed water to impinge on every part of the upper end of the conduit system. Where the entry of gas to the eliminator is horizontal, it is desirable that the level of gas entry be above the level of the spray pipes. Where the eliminator is contained in the same tower with a primary washer, the entry of gas into the eliminator chamber in a vertically upward direction is preferred.

With regard to the diameter of the parallel passages, the centrifugal action on which elimination depends is promoted by a small diameter, the lower limit of which is determined by the necessity of keeping the parallel passages free from dirt. We prefer a diameter of three inches and a length of passage of one foot.

It is an object of the present invention to provide new and improved means and methods for the elimination of moisture from air or gas.

It is a further object to provide a construction in which the moist gas is subjected to centrifugal action due to the flow of the gas.

It is an additional object to provide a construction in which the flow of moist gas is broken up into a plurality of relatively small parallel streams.

It is also an object to provide means and methods whereby the small parallel streams have a passage length substantially greater than the passage diameter.

It is a further object to provide means and methods whereby the gas flow is concurrent with the flow moisture eliminated.

Other and further objects will appear as the description proceeds.

We have shown certain preferred embodiments of carrying on our invention in the accompanying drawings, in which—

Figure 3 is an enlarged fragmentary section showing the parallel conduits; and

Figure 4 is a cross section taken on line 4—4 of Figure 2.

Figure 1:
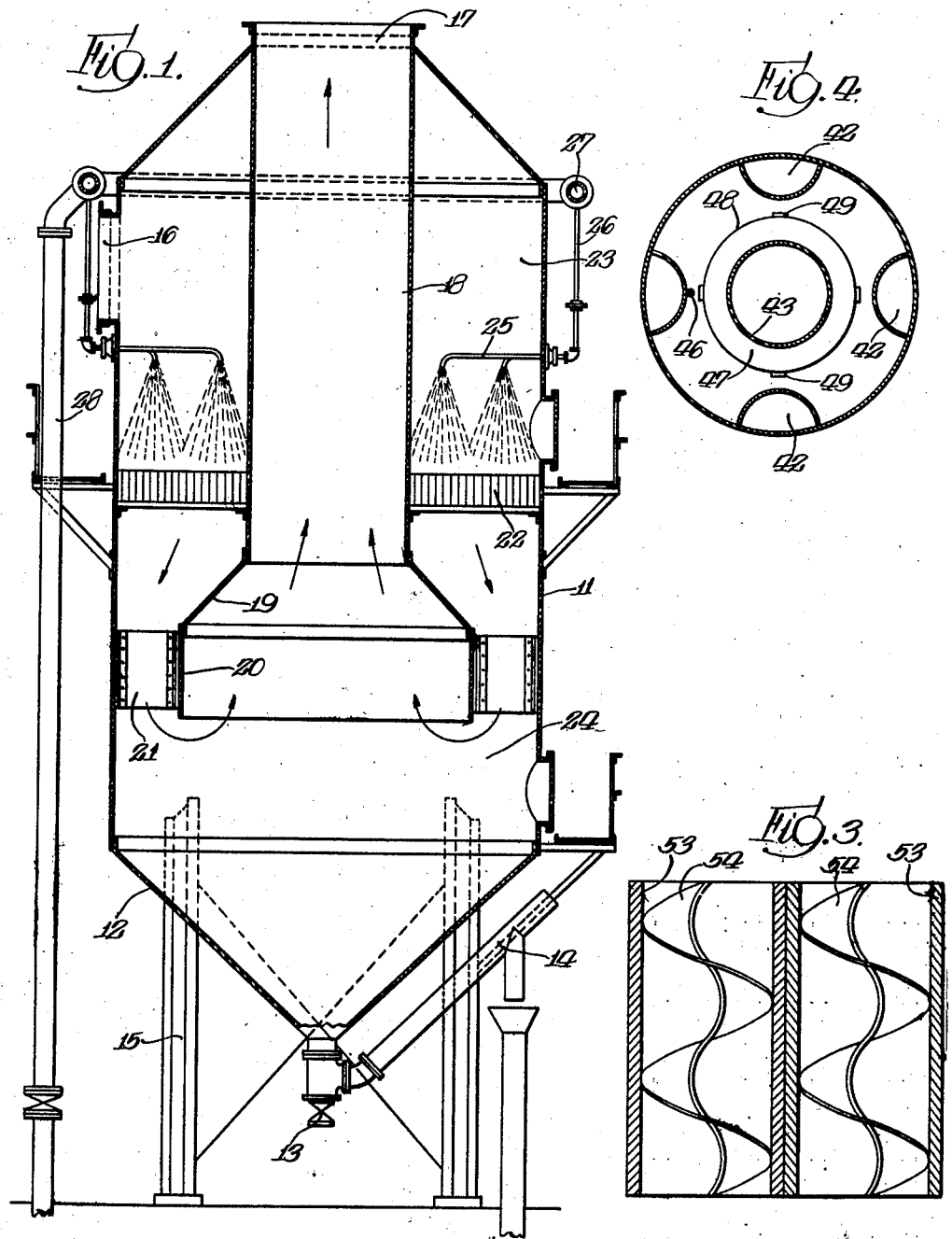
Figure 1 is a vertical section through a separate moisture eliminator.

Referring first to the form of construction shown in Figure 1, the moisture eliminator tower comprises the shell 11 having the conical bottom 12, with the drain valve 13 and overflow pipe 14 for maintaining a predetermined level of liquid in the bottom of the tower. The tower, as shown, is supported on the framework 15. The inlet opening 16 is provided laterally of the upper portion of the tower and serves to introduce the moist gas or air. The outlet opening 17 extends through the top of the tower and is connected to a central passage 18 which extends downwardly into the bell 19 and into larger cylindrical portion 20 which is supported from the sides of the tower by means of the spaced plates 21.

The system of elongated conduits 22 is located between the outer wall of the tower and the inner outlet passage 18, and serves to completely close off communication between the upper inlet chamber 23 and the lower outlet chamber 24, so that all gas or air passing from one chamber to the other must pass through the elongated conduits. The series of spray nozzles 25 are located above the system conduits 22 and below the gas inlet 16. These nozzles are only used intermittently for short periods for the purpose of cleaning the conduits and their vanes. Water is supplied to nozzles 25 through pipes 26, header 27 and riser 28.

Figure 2:
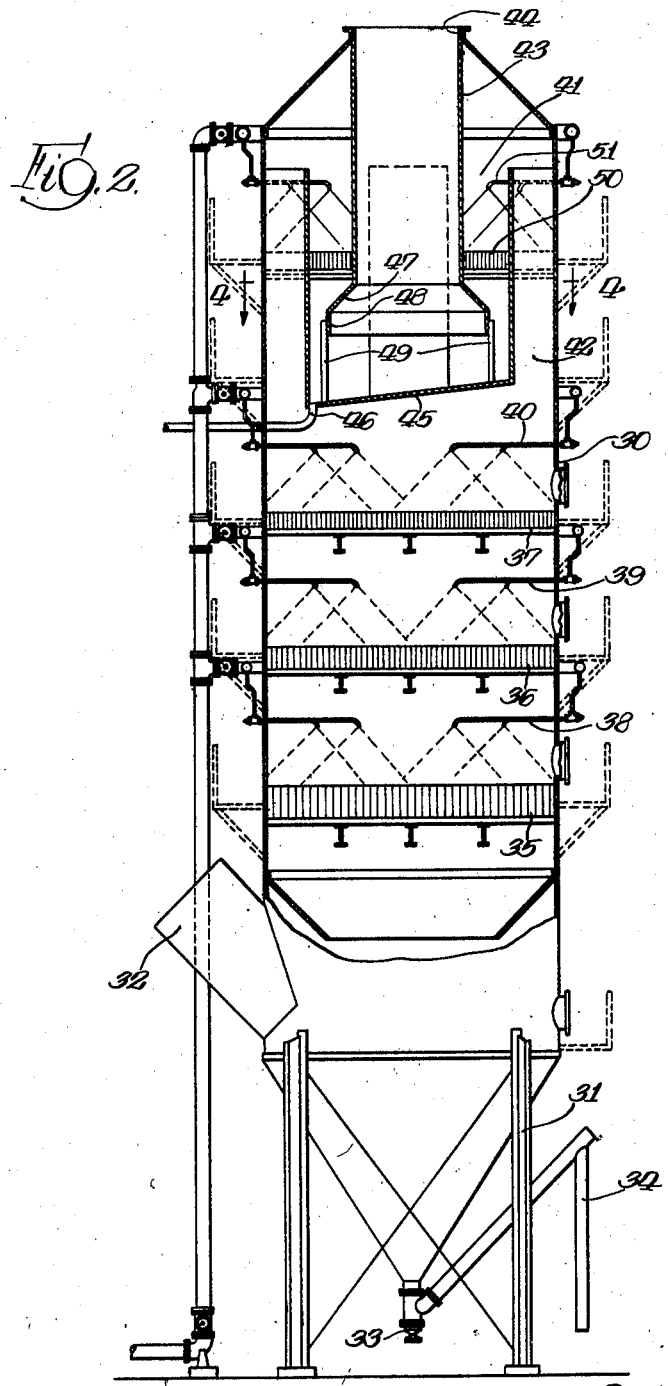
Figure 2 is a vertical section through a moisture eliminator combined with a gas washer tower.

The form of construction shown in Figure 2 comprises a gas washer tower 30 supported on framework 31. This tower has a gas inlet 32 leading into the lower portion thereof and its bottom is provided with outlet valve 33 and an overflow connection 34 which serves to maintain the proper level of liquid in the bottom of the tower. The tower is provided with three spaced gas washing systems 35, 36 and 37. Above these several systems are the spray nozzles 38, 39 and 40 which serve to provide moisture to pass down through the systems and aid in gas washing. This construction is disclosed in the copending application of Arthur J. Boynton, Serial No. 236,213, filed October 21, 1938, and in itself forms no part of the present invention.

The moisture eliminator chamber 41 is provided in the upper portion of the tower and communicates with the top of the gas washer proper through a plurality of approximately semi-circular passages 42 as shown in cross-section in Figure 4. The gas outlet passage 43 communicates with the outlet opening 44 at the top of the tower and extends down toward the bottom 45 of the moisture eliminator chamber. This bottom 45 is inclined and a drain connection 46 is provided for carrying moisture out of the bottom of the chamber. The outlet passage 43 is provided with the belled portion 47 and the lower cylindrical portion 48 which is supported from the bottom 45 of the chamber by the members 49.

The system of moisture eliminating conduits 50 is located between the outer wall of the moisture eliminator chamber and the outlet passage 43, and all gas passing through the moisture eliminator must pass through these conduits. The spray system 51 is provided for washing down the moisture eliminator conduits from time to time.

The type of conduits used in both types of eliminators have been shown in detail in Figure 3. The conduits 53 are provided with the inwardly extending vanes 54. These vanes extend radially inwardly from the outer wall of the conduits and are given a spiral pitch which may be between three-quarters and one and one-half times the diameter of the conduits. The length of the conduits preferably varies from two to six times their diameters. It will be noted that in both constructions the gas flows downwardly through the moisture eliminating conduits so that its flow is in the same direction as the moisture which collects upon the vanes and conduit walls.

While we have shown one preferred embodiment of carrying out our invention, it is capable of change and modification to meet varying conditions and requirements, and we contemplate such modifications as come within the spirit and scope of the appended claims.

We claim:

1. Apparatus for eliminating moisture from gas comprising a housing having upper and lower chambers, spaced vertical passages adjacent the housing walls, said passages leading from the lower and discharging into the upper chamber, an outlet passage extending centrally down into the upper chamber and terminating in the lower portion of the upper chamber, and a system of vertical, elongated parallel conduits of relatively small diameter extending across the area of the upper chamber above the lower end of the outlet passage and below the upper end of the inlet passages.

2. Apparatus for eliminating moisture from gas comprising a housing having upper and lower chambers, spaced vertical passages adjacent the housing walls, said passages leading from the lower and discharging into the upper chamber, an outlet passage extending centrally down into the upper chamber and terminating in the lower portion of the upper chamber, and a system of vertical, elongated parallel conduits of relatively small diameter extending across the area of the upper chamber above the lower end of the outlet passage and below the upper end of the inlet passages, said conduits being provided with inwardly extending radial vanes extending substantially the length of the conduits.

3. Apparatus for eliminating moisture from gas comprising a housing having upper and lower chambers, spaced vertical passages adjacent the housing walls, said passages leading from the lower and discharging into the upper chamber, an outlet passage extending centrally down into the upper chamber and terminating in an enlarged flared open end in the lower portion of the upper chamber, and a system of vertical, elongated parallel conduits of relatively small diameter extending across the area of the upper chamber above the enlarged lower end of the outlet passage and below the upper end of the inlet passages.

4. Apparatus for eliminating moisture from gas comprising a housing having upper and lower chambers, spaced vertical passages adjacent the housing walls, said passages leading from the lower and discharging into the upper chamber, an outlet passage extending centrally down into the upper chamber and terminating in the lower portion of the upper chamber, a system of vertical, elongated parallel conduits of relatively small diameter extending across the area of the upper chamber above the lower end of the outlet passage and below the upper end of the inlet passages, said conduits being provided with inwardly extending radial vanes extending substantially the length of the conduits, and downwardly directed spray means located in the upper chamber above the conduits for periodically washing said conduits and vanes.

ARTHUR J. BOYNTON.
GILBERT D. DILL.